United States Patent [19]
Kuwabara et al.

[11] Patent Number: 5,330,330
[45] Date of Patent: Jul. 19, 1994

[54] ELECTROMAGNETICALLY OPERATED FIXED DISPLACEMENT PUMP

[75] Inventors: Fukuji Kuwabara; Akihiro Fuse; Hiroshi Iizuka; Akira Ogasawara, all of Saitama, Japan

[73] Assignee: Iwaki Co., Ltd., Tokyo, Japan

[21] Appl. No.: 24,953

[22] Filed: Mar. 2, 1993

[51] Int. Cl.$^5$ ............................................. F04B 43/04
[52] U.S. Cl. .................................. 417/413 R; 417/417
[58] Field of Search ............... 417/410, 412, 413, 417, 417/214

[56] References Cited

U.S. PATENT DOCUMENTS

| | | | |
|---|---|---|---|
| 4,021,152 | 5/1977 | Toyoda | 417/417 |
| 4,272,225 | 6/1981 | Fujinaka et al. | 417/417 |
| 4,278,406 | 7/1981 | Cooperrider | 417/417 |
| 4,523,902 | 6/1985 | Wally | 417/417 |
| 4,537,565 | 8/1985 | Edler | 417/413 R |
| 5,055,011 | 10/1991 | Mori | 417/417 |
| 5,074,757 | 12/1991 | Horn | 417/413 R |

*Primary Examiner*—Richard A. Bertsch
*Assistant Examiner*—Peter Korytnyk
*Attorney, Agent, or Firm*—Dickinson, Wright, Moon, Van Dusen & Freeman

[57] ABSTRACT

An electromagnetically operated fixed displacement pump is sought, which can cope with diversification of electromagnetically operated fixed displacement pump products, and internationalization of their destination, readily permits cost reduction by mass production and permits efficient supply and control of products. A terminal portion electrically connected to the electromagnetic coil projects from the top of the pump body. A control unit with a control section for controlling the stroke number is removably mounted on the terminal unit. The pump body is supplied with current from lead pins of a power source connector provided on the control unit through the terminal portion. The control unit is prepared according to the specifications of various pump products. Various control units thus can be replaceably mounted on the terminal portion with the pump body as a common component. It is thus possible to provide pump products meeting various specifications.

8 Claims, 3 Drawing Sheets

ELECTROMAGNETICALLY OPERATED FIXED DISPLACEMENT PUMP

BACKGROUND OF THE INVENTION

This invention relates to an electromagnetically operated fixed displacement pump, which comprises an electromagnetically reciprocating member such as a diaphragm plunger and an electromagnet including an electromagnetic coil driving the reciprocating member and an armature and executes a pumping operation according to a preset discharge rate.

This type of pump is known and disclosed in, for instance, in U.S. Pat. No. 4,537,565. The disclosed pump comprises a pump body, a pump head provided at an end thereof in the axial direction and having an inlet port and a discharge port, the pump body accommodating an electromagnetic coil, a movable armature movable in the axial direction of the pump body with energization of the coil and a reciprocating member movable in unison with the armature in the axial direction of the pump body, the pump head having a pump chamber defined therein and communicating with the inlet port and the discharge port via valve means, the volume of the pump chamber being varied with the reciprocation of the reciprocating member to obtain pumping operation, a stroke adjustment assembly disposed on the side of the pump body opposite the pump head in the axial direction of the pump body for adjusting the stroke of the armature, the stroke adjustment assembly including a stop member displaceable in the axial direction of the pump body, a rotary knob constituting an operating means for causing the displacement of the stop member by external manual rotating operation, and coupling means operatively coupling the rotary knob and the stop member, a stroke number control means for adjustably selecting the frequency of energization of the electromagnetic coil to thereby control the stroke member of the armature, the pump body being provided with power source connection means for energizing the electromagnetic coil.

The pump disclosed in the above U.S. Pat. No. 4,537,565 is a commonly termed diaphragm pump employing a diaphragm as a reciprocating member.

U.S. Pat. No. 4,272,225 discloses a commonly termed plunger type pump using a plunger as a reciprocating member.

In either of these electromagnetically operated fixed displacement pumps, it is necessary to adjust the stroke of the reciprocating member in dependence on the kind of the operating fluid supplied to the pump used in various fields and the preset discharge rate. In addition, for the adjustment of the stroke number of the reciprocating member it is necessary to adjust the control number of the electromagnetic coil controlled by pulse signal. To this end, a pump is prepared for each specification, which is determined in accordance with the use, function level, rated power source in the destination, price and so forth. The main specification of these pump products is the preset discharge rate. The discharge rate is set either by a single control, in which only the stroke is controlled, or a complex control, in which both the stroke and the stroke number are controlled.

The control of the stroke is usually made by adjusting the position of the stop member to be struck by the reciprocating member at the stroke end thereof, as shown in both the United States patents noted above. The stroke adjustment assembly to this end is disposed in the rear end position of the stroke of the reciprocating member. If the pump head is in a front end part, the assembly is provided in a rear end part of the pump body.

The stroke number adjustment is based on electric control of the number of pulses supplied to the electromagnetic coil, as shown in the above U.S. Pat. No. 4,537,565. The stroke number adjustment means to this end is accommodated in the pump body. An operating unit for the stroke number adjustment is provided together with a rotary knob for the stroke adjustment noted above on an operating panel which is disposed in a rear part of the pump body.

In the prior art structure, the control unit for setting the discharge rate is fixed with each product in dependence on the specification. Therefore, although the control is made individually in a predetermined range with a particular product specification, it is impossible to cope with a case requiring control beyond the range noted above or cope with differences of other conditions such as rated power source, that is, to this end it is necessary to prepare a pump product of a new specification. Therefore, even when there is no particular need for altering the pump body structure, the product specifications are extremely various to correspond to the individual conditions. Such various product specifications make difficult the cost reduction by mass production and are also inefficient in the product supply management. Particularly, up to date the purposes are diversified, and the internationalization of the destination is promoted more and more. This means that it is necessary to provide products to be able to meet such a great scope of specifications instantly. With the prior art pump products, however, no measure is found in this respect.

SUMMARY OF THE INVENTION

An object of the invention is to provide an electromagnetically operated fixed displacement pump, which can cope with the diversification of the pump product purposes and internationalization of the destination of the products quickly and in a great scope, readily permits cost reduction by mass production and permits efficient product supply management.

To attain the above object of the invention, there is provided an electromagnetically operated fixed displacement pump, which comprises a control unit with stroke number control means and power source connection means provided thereon, mounting means for detachably mounting the control unit on the outer surface of the pump body, and terminal means for electrically connecting the pump body and the control unit in a state with the control unit mounted on the pump body, whereby a plurality of said control units are provided for various pumps specifications, one of the plurality of the control units being replaceably mounted on the pump body.

With the structure of the electromagnetically operated fixed displacement pump according to the invention, it is possible to have a great variety of control units prepared in correspondence to diversified conditions and provide pump products corresponding to the above various specifications by mounting each corresponding control unit on the pump body via terminal means projecting from the top or either side of the pump body. Thus, with the common pump body it is possible to obtain a mass production effect and permit great cost reduction. Further, efficient product supply control can be obtained.

Further, a control unit according to the invention is one which has a structure provided with second operating means of the stroke adjustment assembly in addition to the stroke number adjustment means. When mounting the unit on the pump body the second operating means is connected so as to replace the first operating means in this case, the stroke adjustment can be made collectively on the unit. Thus, it is possible to provide pumps which can meet specifications of a greater scope.

To permit ready replacement of the first and second operating means of the stroke adjustment assembly with each other, according to the invention there is provided a structure for each control unit that it has an engagement member substantially having the same shape with a tapered outer periphery while forming the stop member in the pump body with an engagement hole having a complementary tapered inner surface such that the engagement member can be detachably fitted in the engagement hole in the axial direction of the pump body.

With this structure, the operating means is secured to the stop member at a desired relative rotational position by coupling means. Thus, the operation of replacing the operating means can be very readily carried out, and the stroke adjustment can be made freely and in a greater scope.

The above features and advantages of the invention will be more fully understood from the detailed description of the preferred embodiments when the same is read with reference to the accompanying drawings.

DETAILED DESCRIPTION OF THE PREFERRED EMBODIMENTS

Figure 1:
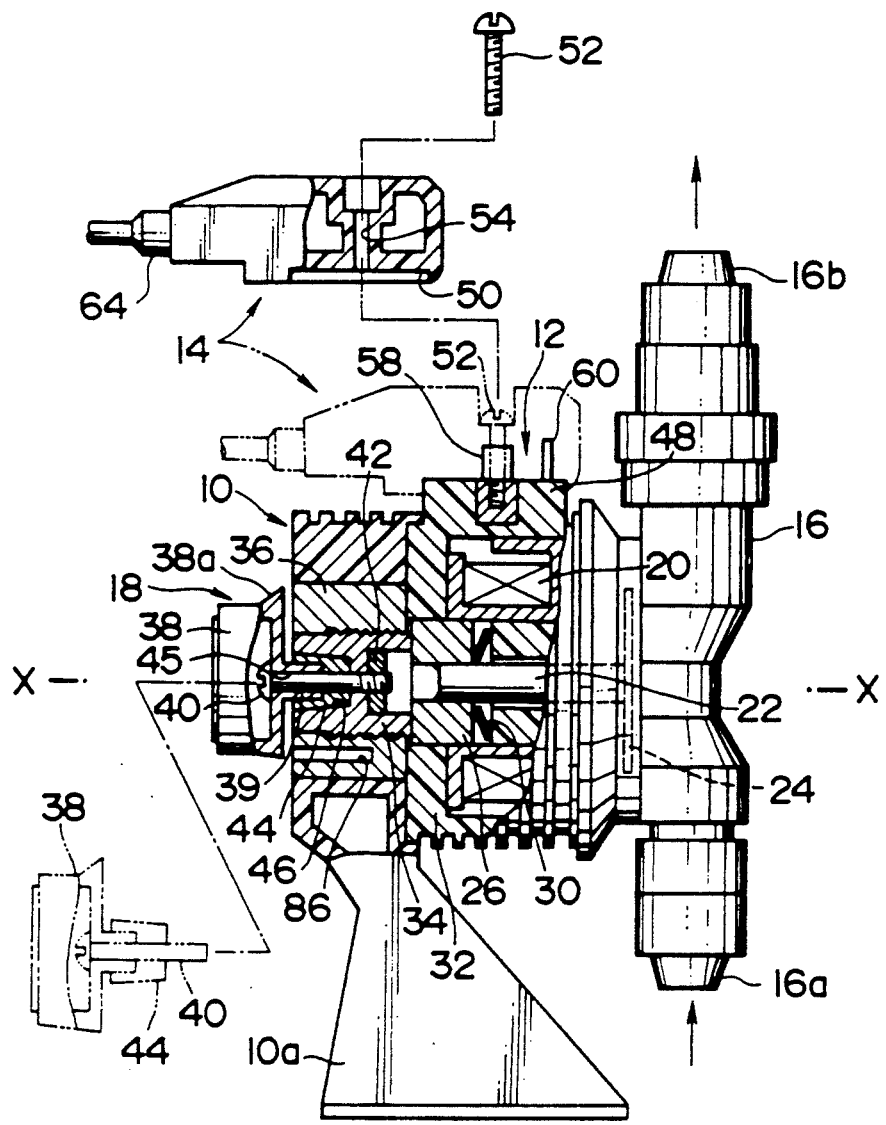
FIG. 1 is an elevational view, partly in section, showing an embodiment of the electromagnetically operated fixed displacement pump together with a control unit of one specification.

Referring to FIG. 1, there is shown an embodiment of the electromagnetically operated fixed displacement pump according to the present invention. The pump comprises a pump body 10 having a pedestal 10a. A terminal portion 12 is provided as terminal means on the top of the pump body 10. Designated at 14 is an example of the control unit mounted replaceably on the terminal portion 12. A pump head 16 is provided on a front end part of the pump body 10 in the axial direction X-X (on the right side in the Figure). A stroke adjustment assembly 18 is provided on a rear end part of the pump body 10 (on the left side in the Figure).

In the pump body 10 are provided an electromagnetic coil 20, a plunger 22 reciprocable in the axial direction X-X of the pump body 10 when the electromagnetic coil 20 is energized, a diaphragm 24 attached to the free end of the plunger 22 and constituting a reciprocating member together with the plunger 22, an armature 26 secured to the stem of the plunger 22 and constituting an electromagnet together with the coil 22, and a restoring spring 30 provided between a synthetic resin frame 32 of the pump body 10 and the armature 26 for biasing the armature 26 toward one end (i.e., return end) of the stroke.

When the electromagnetic coil 20 is energized, the armature 26 is moved in unison with the plunger 22 in the axial direction X-X from the return end as shown in FIG. 1 to cause deformation of the diaphragm 24. In consequence, the volume of a pump chamber, not shown, as a variable volume chamber in the pump head 16 is varied, so that a supply fluid, e.g., a chemical liquid, flows into the pump head 16 through an inlet port 16a via valve means not shown in the direction of arrow and discharged from the pump head at a constant rate through a discharge port 16b via valve means not shown. The construction and operation of the pump as explained above are the same as those disclosed in the U.S. Pat. Nos. 4,272,225 and 4,537,565 and are not described here in detail.

The stroke adjustment assembly 18 has a stop member 34, which is screwed in an adjustment unit frame 36 of the pump body 10 for displacing adjustment in the axial direction X-X. By turning the stop member 34, its position, i.e., its engagement surface at its front end, is axially displaced to change the position of the rear end surface (return end) of the armature 26 in engagement with the engagement surface of the stop member 34. In this way, the stroke adjustment is effected.

Figure 4:
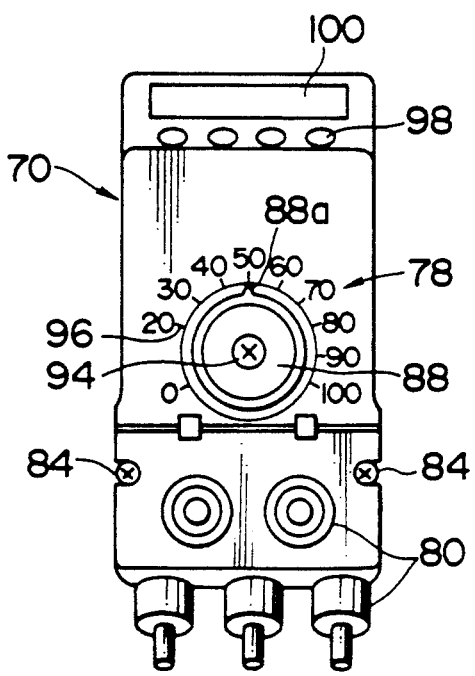
FIG. 4 is a rear end view of the control unit shown in FIG. 3.
Figure 3:
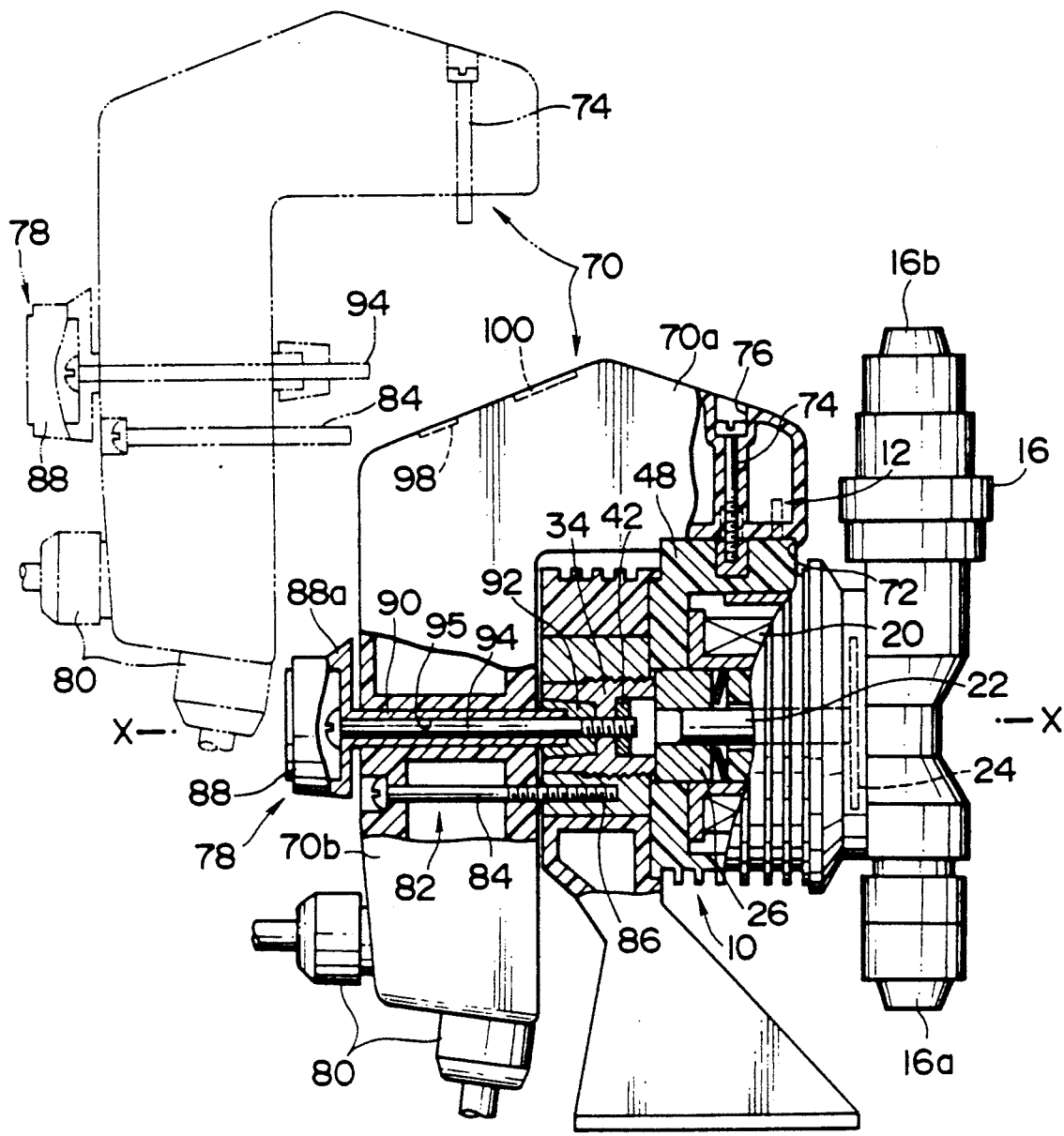
FIG. 3 is an elevational view, partially in section, showing another embodiment of the electromagnetically operated fixed displacement pump together with a control unit of a different specification.

Designated at 38 is a stroke adjustment rotary knob 38 as operating means of the assembly 18. The rotary knob has a pointer 38a, and it is secured to the stop member 34 by an axially fitted bolt 40 and a nut 42 screwed on the bolt 40 at an end portion thereof, the bolt 40 and nut 42 constituting coupling means of the assembly 18. An engagement member 44 having a tapered outer periphery is secured to a boss extension 39 of the rotary knob 38. A hole 45 is formed in the boss extension 39 and the engagement member 44, and the bolt 40 is inserted through the hole 45. The engagement member 44 is received in an engagement hole 46 having a tapered inner periphery. Thus, a wedging action is produced between the tapered engagement surfaces, and thus the rotary knob 38 is secured to the stop member 34 more firmly by making the nut 42 on the bolt 40. In addition, this arrangement of engagement between the engagement member 44 and engagement hole 46 permits the rotary knob 38 to be secured to the stop member 34 at a desired rotary position relative thereto. It is thus possible to freely set the reference rotational angle position in the adjustment range. By suitably turning the rotary knob 38 the stop member 34 is rotated in unison with it. Thus, adjustment in the axial direction X-X can be obtained. As for the amount of rotation of the rotary knob 38, as in a different control unit 70 shovel in FIG. 4, the rear surface of the pump body 10 is provided with a scale 96 as shown in FIG. 4. A desired stroke can be set by setting the pointer 38a to the corresponding position on the scale 96. When mounting a different control unit 70, for instance as shown in FIG. 3 and described later, of the stroke adjustment assembly 18 of the pump body 10 the rotary knob 38 is removed together with the engagement member 44 and the bolt 40, as shown by phantom lines in FIG. 1. The nut 42 is left in the stop member 34 at this time. The nut 42 has a rectangular sectional profile, and it is accommodated in a recess having a complementary shape formed in the stop member 34. The rotation of the nut 42 is thus prevented when screwing the bolt 40.

As noted above, with the stroke adjustment assembly 18 of the pump body 10, the operating means structure including the rotary knob 38 can be removed according to the specification of the control unit to be mounted.

Figure 2:
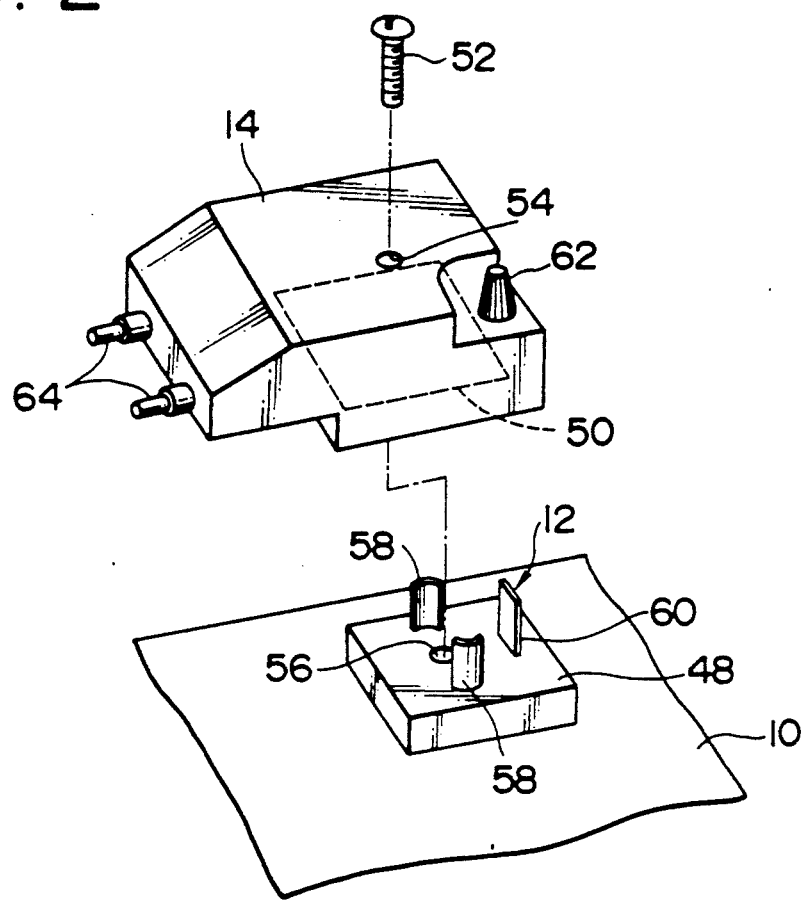
FIG. 2 is a perspective view, to an enlarged scale, showing a control unit and a terminal portion.

As shown in FIGS. 1 and 2, the control unit 14 has an engagement recess 50, which is fitted on a rectangular mounting base 48 formed by molding together with the frame 32 on top of the pump body 10. As shown by phantom lines, the control unit is detachably mounted on the pump body 10 by inserting the mounting bolt 52 as securing means through a bolt insertion hole 54 with the mounting base 48 held engaged and screwing the bolt 52 into a bolt reception hole 56 formed in the mounting base 48.

The terminal portion 12, as seen particularly from FIG. 2, comprises a pair of coil tabs 58 provided on the opposite sides of the bolt hole 56 and a grounding tab 60. When the control unit 14 is mounted on the pump body 10, the tabs 58 and 60 are inserted to respective receptacles, not shown, provided in the control unit 14 to effect electric connection. Further, as shown in FIG. 2, a stroke number adjustment rotary knob 62 is provided as stroke number control means on the control unit 14 at a corner thereof. By suitably turning the knob 62 in the state of conduction, the frequency of a pulse signal supplied to the electromagnetic coil 20 of the pump body 10 via the coil tabs 58 is changed. In this way, the stroke number of the armature 26 can be adjusted.

The control unit 14 further has a power source connector 64 provided at its rear end. An external power source, not shown, is connected to the connector for energization of the electromagnetic coil 20 and other control elements in the pump body 10 via the control unit 14.

Now, the manner of mounting a different control unit 70 in lieu of the control unit 14 on the pump body 10 shown in FIG. 1 will be described with reference to FIGS. 3 and 4. The pump body 10, as the other part of the pump than the control unit 70, is as shown in FIG. 1, and thus it is designated by like reference numeral and not described.

The control unit 70, unlike the control unit 14, has an L-shaped form as a whole. As shown by solid lines in the Figures, it is detachably mounted such as to cover the top and rear part of the pump body 10. Like the control unit 14, the unit 70 has an upper structure 70a for being replaceably mounted on the terminal portion 12 of the pump body 10. More specifically, an engagement recess 72 for fitting on the mounting base 48 and a bolt insertion hole 76 for inserting a mounting bolt 74 are formed, and also receptacles, not shown, associated with the tabs 58 and 60 of the terminal portion 12 are provided.

The rear part 70b of the control unit 70 is provided with the second operating means 78 of the stroke adjustment assembly and a power source connector 80 and further mounting means 82 for mounting the second operating means 78 on the pump body 10. The control unit 70 has a large size, and with the mounting means 82 further stability of mounting is ensured. More specifically, a mounting bolt 84 as the mounting means is screwed in a bolt mounting hole 86 formed in the pump body 10.

The control unit 70 is mounted after removing the first operating means part including the rotary knob 38 on the pump body 10 as shown by phantom lines in FIG. 1. After the removal, the second operating means 78 of the stroke adjustment assembly on the control unit 70 is coupled to the stop member 34 of the assembly 18 remaining on the pump body 10. The second operating means 78 on the control unit 70 comprises a rotary knob 88, an elongate boss 90 integral therewith, an engagement member 92 secured to the end of the boss 90 and having a tapered outer peripheral surface and an elongate mounting bolt 94. After the control unit 70 has been secured to the pump body 10 with the mounting bolts 74 and 84, a bolt 94 is inserted through a hole 95 formed in the boss 90 and engagement member 92, and the nut 42 in the pump body 10 is screwed on the bolt 94. In this way, the second operating means 78 is mounted as shown by solid lines in FIG. 3. Like the assembly 18 shown in FIG. 1, the stroke is adjusted by turning the rotary knob 88. The knob 88, the pointer 88a thereof and the scale 96 are as shown in FIG. 4. The scale 96 represents the stroke in per cent. A desired stroke can be set by setting the pointer 88a to the corresponding position on the scale 96.

A stroke number adjustment means 98 on the control unit 70 comprises a touch switch on the top 70a of the unit 70. A desired stroke number to be set is displayed on a display panel 100 by operating the switch. At any rate, like the previous control unit 14, the stroke number adjustment is transmitted to the electromagnetic coil 20 via the terminal portion 12 by operation on the control unit 70. In this control unit, both the stroke and the stroke number are adjustable. In addition, the power source connector 80 has more power source cord pins than those of the control unit 14, so that in addition to the power source supply and stroke adjustment operation external control signals may be input via the power source connector 80 for suitable setting by using the touch switch and display panel. The unit 70 thus can cope with specifications of higher performance pump products.

The control unit 70 can be easily removed from the pump body 10 by removing the bolts 74 and 84 and the mounting bolt 94 of the second operating means 78. When mounting the control unit 14 again, the first operating means such as the rotary knob 38 of the pump body 10 may be mounted again.

In the embodiment explained above the terminal portion 12 is disposed such that it projects from the top of the pump body 10, it is possible to dispose the terminal portion 12 on one side of the pump body 10. The rear end part of the pump body has no substantial space redundancy because the space is occupied by the stroke adjustment rotary knob. On the other hand, it is possible to secure sufficient space for disposing the terminal portion in the top and side parts of the pump body. In this case, the high performance type control unit 70 may have an L-shaped structure covering the side and rear end portions of the pump body.

What is claimed is:

1. A modular electromagnetically operated fixed displacement pump comprising a common pump body for use with a selected one of a plurality of control units, said pump body having a closed exterior surface, a pump head provided at an end thereof in the axial direction and having an inlet port and discharge port, said pump body accommodating an electromagnetic coil, a movable armature movable in the axial direction of said pump body with energization of said coil and a reciprocating member movable in unison with said armature in the axial direction of said pump body, said pump head having a pump chamber defined therein and communicating with said inlet port and said discharge port via valve means, the volume of said pump chamber being varied with the reciprocation of said reciprocating member to obtain pumping operation, a stroke adjustment assembly disposed on the side of said pump body opposite said pump head in the axial direction of said pump body for adjusting the stroke of said armature, said stroke adjustment assembly including a stop member displaceable in the axial direction of said pump body, operating means for causing the displacement of said stop member by external manual rotating operation, and coupling means operatively coupling said operating means and said stop member, stroke number control means for adjustably selecting the frequency of energization of said electromagnetic coil to thereby control the stroke number of said armature, said pump body being provided with power source connection means for energizing said electromagnetic coil, said electromagnetically operated fixed displacement pump further comprising:

a control unit with said stroke number control means and said power source connection means provided thereon;

mounting means for detachably mounting said control unit on the exterior surface of said pump body; and terminal means for electrically connecting said pump body and said control unit when said control unit is mounted on said pump body;

whereby a plurality of said control units are provided as said control unit for various pump specifications, one of said plurality of control units being replaceably mounted on said pump body to be adapted for each pump specification.

2. The electromagnetically operated fixed displacement pump according to claim 1, wherein said coupling means of said stroke adjustment assembly removably couples said operating means thereof to said stop member.

3. The electromagnetically operated fixed displacement pump according to claim 2, wherein said control unit includes second operating means different from said operating means of said stroke adjustment assembly provided on said pump body, said second operating means is mounted on said pump body by replacing the operating means on said pump body when said control unit is mounted on said pump body.

4. The electromagnetically operated fixed displacement pump according to claim 3, wherein said operating means on said pump body and said second operating means have respective engagement members having a tapered outer periphery and having substantially the same shape, and said stop member has an engagement hole having a tapered inner surface, said engagement member being fitted in said engagement hole in the axial direction of said pump body, the engagement between said engagement member and said engagement hole being effective for said operating means to be secured to said stop member by said coupling means at a desired relative rotational position.

5. The modular electromagnetically operated fixed displacement pump according to claim 1, wherein said mounting means includes a rectangular mounting base projecting from the exterior surface of the pump body, and said control unit has an engagement recess engaged on said mounting base when said control unit is mounted on said pump body.

6. A modular electromagnetically operated fixed displacement pump comprising a common pump body for use with a selected one of a plurality of control units, said pump body having a closed exterior surface, a pump head provided at an end thereof in the axial direction and having an inlet port and discharge port, said pump body accommodating an electromagnetic coil, a movable armature movable in the axial direction of said pump body with energization of said coil and a reciprocating member movable in unison with said armature in the axial direction of said pump body, said pump head having a pump chamber defined therein and communicating with said inlet port and said discharge port via valve means, the volume of said pump chamber being varied with the reciprocation of said reciprocating member to obtain pumping operation, a stroke adjustment assembly disposed on the side of said pump body opposite said pump head in the axial direction of said pump body for adjusting the stroke of said armature, said stroke adjustment assembly including a stop member displaceable in the axial direction of said pump body, operating means for causing the displacement of said stop member by external manual rotating operation, wherein said operating means of said stroke adjustment assembly has an engagement member having a tapered outer peripheral surface, said stop member having an engagement hole having a tapered inner surface, said engagement member being engaged in said engagement hole in the axial direction of said pump body, the engagement between said engagement member and said engagement hole being effective for said operating means to be secured to said stop member by said coupling means at a desired relative rotational position, and coupling means operatively coupling said operating means and said stop member, wherein said coupling means of said stroke adjustment assembly removably couples said operating means thereof to said stop member, stroke number control means for adjustably selecting the frequency of energization of said electromagnetic coil to thereby control the stroke number of said armature, said pump body being provided with power source connection means for energizing said electromagnetic coil, said electromagnetically operated fixed displacement pump further comprising:

a control unit with said stroke number control means and said power source connection means provided thereon;

mounting means for detachably mounting said control unit on the exterior surface of said pump body; and terminal means for electrically connecting said pump body and said control unit when said control unit is mounted on said pump body;

whereby a plurality of said control units are provided as said control unit for various pump specifications, one of said plurality of control units being replaceably mounted on said pump body to be adapted for each pump specification.

7. A modular electromagnetically operated fixed displacement pump comprising a common pump body for use with a selected one of a plurality of control units, said pump body having a closed outer peripheral surface, a pump head provided at an end thereof in the axial direction and having an inlet port and discharge port, said pump body accommodating an electromagnetic coil, a movable armature movable in the axial direction of said pump body with energization of said coil and a reciprocating member movable in unison with said armature in the axial direction of said pump body, said pump head having a pump chamber defined therein and communicating with said inlet port and said discharge port via valve means, the volume of said pump chamber being varied with the reciprocation of said reciprocating member to obtain pumping operation, a stroke adjustment assembly disposed on the side of said port body opposite said pump head in the axial direction of said pump body for adjusting the stroke of said armature, said stroke adjustment assembly including a stop member displaceable in the axial direction of said pump body, operating means for causing the displacement of said stop member by external manual rotating operation, and coupling means operatively coupling said operating means and said stop member, wherein said coupling means of said stroke adjustment assembly removably couples said operating means thereof to said stop member, stroke number control means for adjustably selecting the frequency of energization of said electromagnetic coil to thereby control the stroke number of said armature, said pump body being provided with power source connection means for energizing said electromagnetic coil, said electromagnetically operated fixed displacement pump further comprising:

a control unit with said stroke number control means and said power source connection means provided thereon, said control unit including a second operating means different from said operating means of said stroke adjustment assembly provided on said pump body, said second operating means being mounted on said pump body by replacing the operating means on said pump body when said control unit is mounted on said pump body;

mounting means for detachably mounting said control unit on the exterior surface of said pump body; and terminal means for electrically connecting said pump body and said control unit when said control unit is mounted on said pump body;

whereby a plurality of said control units are provided as said control unit for various pump specifications, one of said plurality of control units being replaceably mounted on said pump body to be adapted for each pump specification.

8. The modular electromagnetically operated fixed displacement pump of claim 9, wherein said operating means on said pump body and said second operating means have respective engagement numbers having a tapered outer periphery and having substantially the same shape, and said stop member has an engagement hole having a tapered inner surface, said engagement member being fitted in said engagement hole in the axial direction of said pump body, the engagement between said engagement member and said engagement hole being effective for said operating means to be secured to said stop member by said coupling means at a desired relative rotational position.

* * * * *